(12) United States Patent
Hadar et al.

(10) Patent No.: US 9,336,331 B2
(45) Date of Patent: May 10, 2016

(54) DETECTING, USING, AND SHARING IT DESIGN PATTERNS AND ANTI-PATTERNS

(75) Inventors: Eitan Hadar, Nesher (IL); Kieron John James Connelly, Brighton (GB); Olga Lagunova, Butler, PA (US); Peter Anthony Lazzaro, Great River, NY (US)

(73) Assignee: CA, INC., Islandia, NY (US)

( * ) Notice: Subject to any disclaimer, the term of this patent is extended or adjusted under 35 U.S.C. 154(b) by 630 days.

(21) Appl. No.: 12/767,357

(22) Filed: Apr. 26, 2010

(65) Prior Publication Data

US 2011/0265064 A1  Oct. 27, 2011

(51) Int. Cl.
*G06F 9/44* (2006.01)
*G06F 17/30* (2006.01)

(52) U.S. Cl.
CPC ........... *G06F 17/30985* (2013.01); *G06F 8/36* (2013.01); *G06F 8/77* (2013.01)

(58) Field of Classification Search
None
See application file for complete search history.

(56) References Cited

U.S. PATENT DOCUMENTS

| | | | |
|---|---|---|---|
| 6,574,605 B1 * | 6/2003 | Sanders et al. ............... | 705/7.26 |
| 6,681,344 B1 * | 1/2004 | Andrew ...................... | 714/38.14 |
| 6,742,141 B1 * | 5/2004 | Miller .............................. | 714/26 |
| 6,851,105 B1 * | 2/2005 | Coad et al. ................... | 717/106 |
| 7,065,624 B1 * | 6/2006 | Zahavi .......................... | 711/170 |
| 7,213,231 B1 * | 5/2007 | Bandhole et al. ............. | 717/121 |
| 7,237,023 B2 * | 6/2007 | Menard ................. | G06Q 30/06 709/223 |
| 7,363,543 B2 * | 4/2008 | Peebles ............... | G06F 11/0715 714/26 |
| 7,424,530 B2 * | 9/2008 | Chagoly ............. | G06F 11/3466 705/7.38 |
| 7,627,861 B2 * | 12/2009 | Smith et al. .................... | 717/144 |
| 7,730,364 B2 * | 6/2010 | Chang .................. | G06F 11/008 714/47.2 |
| 7,734,451 B2 * | 6/2010 | MacArthur ........ | G05B 13/0295 702/185 |
| 7,757,214 B1 * | 7/2010 | Palczak et al. ................ | 717/121 |
| 7,769,562 B2 * | 8/2010 | Vaidyanathan ....... | G06F 11/008 700/29 |
| 7,818,723 B2 * | 10/2010 | AliKacem ............... | G06F 9/524 717/131 |
| 8,136,090 B2 * | 3/2012 | Boss et al. ..................... | 717/121 |
| 8,225,221 B2 * | 7/2012 | Beran et al. ................... | 715/762 |
| 2003/0005112 A1 * | 1/2003 | Krautkremer ................ | 709/224 |
| 2004/0034698 A1 * | 2/2004 | Abu-Husein et al. ......... | 709/223 |
| 2005/0086246 A1 * | 4/2005 | Wood ................ | G06F 17/30289 |
| 2005/0166193 A1 * | 7/2005 | Smith et al. .................... | 717/143 |
| 2005/0235248 A1 * | 10/2005 | Victoria et al. ............... | 717/102 |
| 2006/0053422 A1 * | 3/2006 | Alikacem et al. ............. | 718/100 |
| 2006/0161884 A1 * | 7/2006 | Lubrecht et al. .............. | 717/104 |
| 2006/0225032 A1 * | 10/2006 | Klerk et al. .................... | 717/105 |

(Continued)

OTHER PUBLICATIONS

"automatic", Dictionary.com, retreived May 16, 2014, <http://dictionary.reference.com/browse/automatic>, p. 1.*

(Continued)

*Primary Examiner* — Thuy Dao
*Assistant Examiner* — Samuel Hayim
(74) *Attorney, Agent, or Firm* — Gilliam IP PLLC (57) ABSTRACT

Various embodiments described and illustrated herein include at least one of systems, methods, and software to identify, use, or share patterns and anti-patterns. Embodiments that include pattern and anti-pattern identification operate to identify candidate patterns and anti-patterns within a deployed system and to confirm or receive confirmation that the identified candidates are indeed patterns or anti-patterns. Embodiments that use patterns and anti-patterns operate to consume the identified patterns and anti-patterns to improve system performance. The embodiments that share patterns and anti-patterns include mechanisms whereby patterns and anti-patterns can be sent to and received from other systems.

19 Claims, 8 Drawing Sheets

(56) References Cited

U.S. PATENT DOCUMENTS

| | | | |
|---|---|---|---|
| 2006/0253840 A1* | 11/2006 | Cruickshank et al. | 717/127 |
| 2007/0083500 A1* | 4/2007 | Zibitsker | G06F 9/5083 |
| 2007/0156420 A1* | 7/2007 | Meier et al. | 705/1 |
| 2007/0157156 A1* | 7/2007 | Meier et al. | 717/101 |
| 2008/0134135 A1* | 6/2008 | Elaasar | 717/104 |
| 2009/0031176 A1* | 1/2009 | Ide | G06F 11/0709 |
| | | | 714/47.2 |
| 2009/0193064 A1* | 7/2009 | Chen et al. | 707/204 |
| 2010/0145755 A1* | 6/2010 | Narkilahti | 705/8 |
| 2011/0022551 A1* | 1/2011 | Dixon | 706/12 |
| 2011/0213738 A1* | 9/2011 | Sen et al. | 706/12 |
| 2011/0270804 A1* | 11/2011 | Hadar et al. | 707/684 |

OTHER PUBLICATIONS

Aaron Kim, "Enterprise 2.0 Anti-Patterns, ROI and metrics", IBM, 2009, <http://cdn.oreillystatic.com/en/assets/1/event/22/Enterprise%20Web%202_0%20Anti-Patterns,%20ROI,%20and%20Metrics%20Presentation.pdf>, pp. 1-81.*

Hakan Hacigumus, "Anti-patterns: Integrating Distributed and Heterogeneous Data Sources in SOAs", IEEE, 2008, <http://ieeexplore.ieee.org/stamp/stamp.jsp?tp=&arnumber=4578306>, pp. 1-2.*

Trevor Parsons, "A Framework for Detecting Performance Design and Deployment Antipatterns in Component Based Enterprise Systems", ACM, 2005, <http://delivery.acm.org/10.1145/1110000/1101147/a7-parsons.pdf>, pp. 1-5.*

* cited by examiner

| DATABASE SERVER DB3-#23 | |
|---|---|
| NAME | ERP-BW-1 |
| DESCRIPTION | MAIN DB FOR ERP BW IN EMEA |
| # OF LICENSES | 4 |
| COST/LICENSE | 18000.00 |
| MAINT COSTS | 1200.00 |

| DATABASE SERVER | |
|---|---|
| NAME | STRING |
| DESCRIPTION | STRING |
| # OF LICENSES | NUMBER |
| COST/LICENSE | MONEY |
| MAINT COSTS | MONEY |

DETECTING, USING, AND SHARING IT DESIGN PATTERNS AND ANTI-PATTERNS

BACKGROUND INFORMATION

In software engineering and enterprise systems, patterns refer to recommendations for designing well-known solutions to well-defined problems. Anti-Patterns are described as the symptoms, or other system properties, that indicate a bad solution, or anti-pattern, was implemented for a known problem. Such prototypical micro-architecture solutions enable copying of patterns and adaptation of particular design structures to solve recurrent problems described by the copied patterns. Also, anti-patterns enable evaluation of deployed solutions to identify problems.

Pattern and anti-pattern detection has been a difficult process. It is quite possible that there are many patterns and anti-patterns that have been implemented many times, but not identified. Without being identified, patterns and anti-patterns cannot be used to assist in system design and configuration or to identify systems having design and configuration issues before problems arise.

SUMMARY

Various embodiments described and illustrated herein include at least one of systems, methods, and software to identify, use, or share patterns and anti-patterns. Embodiments that include pattern and anti-pattern identification operate to identify candidate patterns and anti-patterns within a deployed system and to confirm or receive confirmation that the identified candidates are indeed patterns or anti-patterns. Embodiments that use patterns and anti-patterns operate to consume the identified patterns and anti-patterns to improve system performance. The embodiments that share patterns and anti-patterns include mechanisms whereby patterns and anti-patterns can be sent to and received from other systems.

Some embodiments include a method that may be performed to identify patterns and anti-patterns within a system. Embodiments of this method include maintaining, in a configuration item database stored on a data storage device, data representative of configuration item settings of a computing system. The configuration item database may include configuration item data that is representative of current configuration settings and previous configuration settings. The configuration item data typically includes a time element identifying a period when each particular item of configuration item data was operative within the computing system. The method further includes periodically applying at least one performance metric to the computing system through execution of instructions on at least one computer processor to obtain performance metric data indicative of performance with regard to at least a portion of the computing system. Additionally the method, based on performance levels over time, includes identifying candidate configuration setting patterns associated with maintained and improved service levels. The identifying method also includes identifying candidate configuration setting anti-patterns associated with deteriorating and non-improving, low service levels. The method may then store data representative of the identified candidate configuration setting patterns and anti-patterns.

Another embodiment is in the form of a system including at least one processor, at least one memory device, and at least one data storage device. The system also includes a pattern repository stored on the at least one data storage device. The pattern repository stores pattern data structures each including data representative of computing system configuration item configuration settings defining a pattern or anti-pattern. The system may also include a performance metric database storing performance metrics executable by the at least one processor to measure performance of a computing system based on performance related data obtained from processes of the computing system and devices upon which the computing system operates. The performance metric database also stores performance metric data provided as a result of applying performance metrics, each performance metric data item including a time data element identifying when the performance metric data was generated.

The system further includes a system improvement module having instructions stored and retrievable from the at least one data storage device in to the at least one memory device that are executable by the at least one processor to perform various tasks. These tasks include measuring performance of the computing system by applying at least one performance metric retrieved from the performance metric database. When applying the at least one performance metric reveals a performance issue within the computing system, the tasks include querying the pattern repository to identify a pattern, the implementation of which is likely to improve performance of the computing system with regard to the revealed performance issue and implementing the identified pattern in the computing system.

Another embodiment is in the form of a computer-readable storage medium. The computer readable storage medium includes instructions stored thereon, which when executed by at least one processor of a computer, cause the computer to perform various tasks. These tasks include receiving pattern data structures from a plurality of constituent system improvement module systems, the pattern data structures each including data representative of computing system configuration item configuration settings defining a pattern or anti-pattern and metadata descriptive of the pattern or anti-pattern represented by the data structure. These tasks further include comparing a received pattern data structure to other received pattern data structures to identify variations and generate groups of similar pattern data structures and presenting a view of commonality between a group of similar pattern data structures. The tasks that the instructions cause the computer to perform also include receiving input to abstract the commonality between the group of similar pattern data structures to generate a single template pattern data structure and storing the template pattern data structure in a network location accessible by the constituent system improvement module systems.

DETAILED DESCRIPTION

As mentioned above, in software engineering and enterprise systems, patterns refer to recommendations for designing well-known solutions to well-defined problems. Anti-Patterns are symptoms, or other system properties, that indicate a bad solution, or anti-pattern, was implemented for a known problem. Such prototypical micro-architecture solutions enable copying of patterns and adaptation of particular design structures to solve recurrent problems described by the copied patterns. Also, anti-patterns enable evaluation of deployed solutions to identify problems that may or may not be apparent.

Patterns are therefore sophisticated tips and tricks indicating that a certain solution was implemented successfully over a set of solutions and constructed approximately the same way. Anti-patterns are the converse where the sophisticated tips and tricks indicate that a certain solution was implemented unsuccessfully over a set of solutions and constructed approximately the same way. With these definitions of patterns and anti-patterns in mind, for ease of explanation, patterns and anti-patterns are at times commonly referred to as patterns.

Information Technology (IT) design often involves combinations of IT infrastructure technology known as Configuration Items (CIs), as well as other supporting processes that collectively, based on modeled associations, construct a logical group of CIs, known as a service model. The CIs may represent elements of IT infrastructure technology such as routers, switches, data storage devices, servers, client computers, logical server programs and processes, and applications and processes that execute on server or client computers. Service models may be associated with metrics. The associated metrics that evaluate parameters of the service model to obtain indicators of quality, availability, risk, and heath levels of an underlying system, and what constituent CIs are influencing the service model. These metrics and indicators can be defined with Service Level Agreements or Objectives (SLA or SLO) and their associated operational level agreements.

A pattern, in some embodiments, is a set of CIs of a service model associated with maintained or improved service levels as measured by at least one SLA or other metric. An anti-pattern, in some embodiments, is a set of CIs of a service model associated with deteriorating or non-improving, low service levels as measured by at least one SLA or other metric. An anti-pattern may also include a set of CIs of a service model that may create future system scalability issues.

Patterns and anti-patterns are represented and stored in a pattern data structure. A pattern data structure includes data representative of CI configuration settings defining a pattern or anti-pattern. The data representative of the CI configuration settings defining a pattern or anti-pattern can be instantiated in a target computing system to implement the pattern or to detect the anti-pattern. Pattern data structures are stored typically in a pattern repository, such as on a hard disk of a computing device. To facilitate searching and identification of patterns and anti-patterns of interest, the pattern data structure may include additional data such as metadata that facilitates searching, provides data to present a visualization of the pattern or anti-pattern, provides a description of the purposes of the pattern, identifies affected configuration items, processes, and services, and other data depending on the particular embodiment. However, before a pattern or anti-pattern may be utilized to identify a possible system configuration, the pattern or anti-pattern needs to be defined.

Various embodiments described and illustrated herein include at least one of systems, methods, and software to identify, use, or share patterns and anti-patterns. Such embodiments are described below in this order, pattern and anti-pattern identification, use, and sharing. Embodiments that include pattern and anti-pattern identification operate to identify candidate patterns and anti-patterns within a deployed system and to confirm or receive confirmation that the identified candidates are indeed patterns or anti-patterns. Embodiments that use patterns and anti-patterns operate to consume the identified patterns and anti-patterns to improve system performance. The embodiments that share patterns and anti-patterns include mechanisms whereby patterns and anti-patterns can be sent to and received from other systems.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or, other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Pattern and Anti-Pattern Detection

Pattern and anti-pattern identification is performed, in some embodiments, through evaluation of performance metric values over time in view of CI configuration settings and changes thereto. Performance metrics are typically applied on a recurring, periodic basis and a record of performance metric values may be stored in a repository, such as a database. Historical CI configuration setting values may also be stored in a database with a time element indicating when the particular CI configuration settings values were active with regard to a particular system, device, or other IT resource. A process may then execute to identify potential patterns and anti-patterns by associating changes to CI configuration setting values with changes in performance metric values. When the change in a performance metric value is positive, that may indicate a potential pattern—while a negative change in the performance metric value may indicate a potential anti-pattern. Thus, IT system administrators, in some embodiments, are provided with visualization tools to view and monitor system health, quality, and risk over various periods to assist in pattern and anti-pattern identification. The user interface 100 of FIG. 1 is an example of how such visualizations may be provided.

Figure 1:
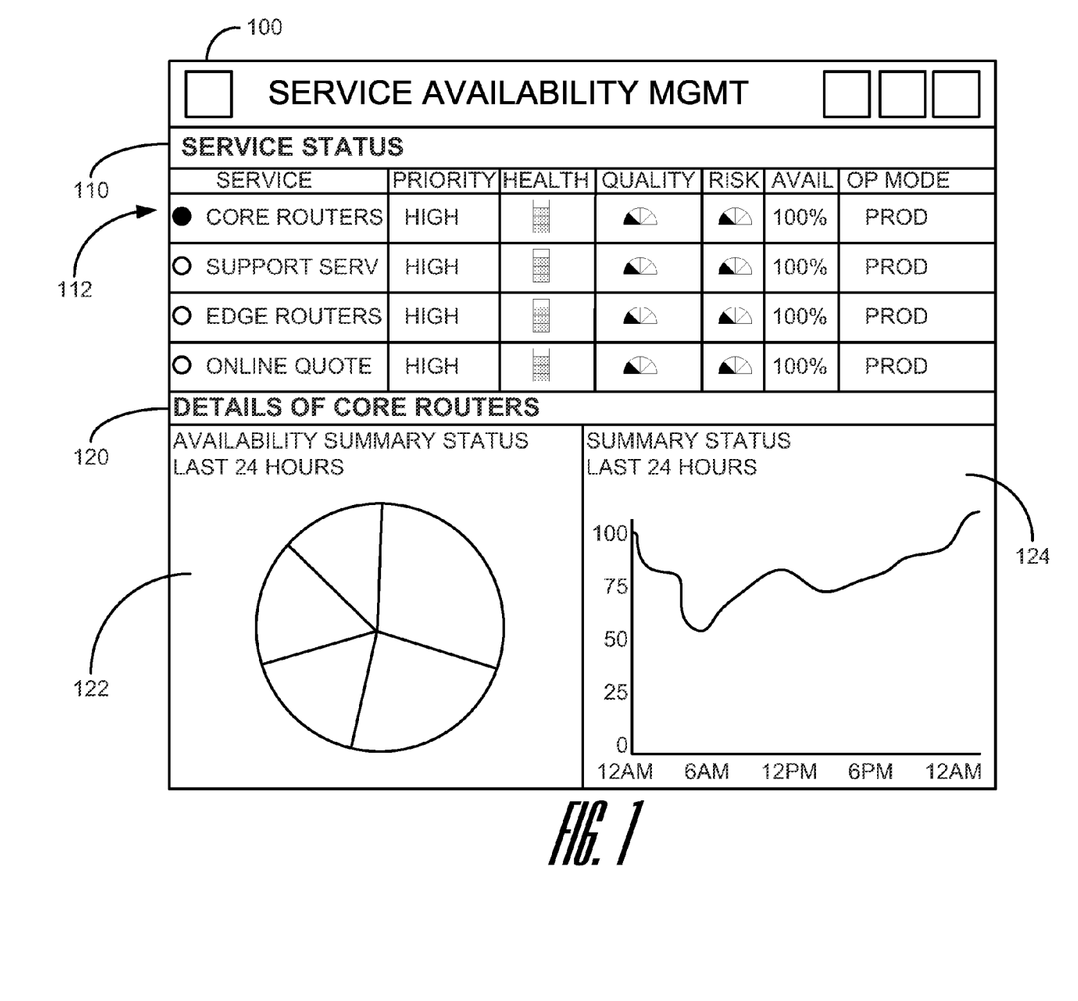
FIG. 1 is a user interface illustration according to an example embodiment.

FIG. 1 is a user interface 100 illustration according to an example embodiment. The user interface 100 is an example user interface included in some embodiments to provide visualization options to a system administrator for monitoring system performance over time. The example user interface 100 provides a view of a current service status 110 with regard to several services. When one of these listed services is selected, such as the CORE ROUTERS service 112, details 120 of the CORE ROUTERS service 112 are displayed within the user interface 100.

The service status 110 portion of the user interface 100 includes rows of data with each row representing various aspects of the health of a service operating within a system or computing environment. Note that a service is used herein to refer to a software service, a device, or group of two or more software services and devices. Each listed service in the service status portion 110 includes data identifying the service, the priority of the respective service to overall system health, and a representation of the overall health of the service. The data represented for each service is typically retrieved from a performance metric repository, such as a database, and presented in the user interface 100. The overall health of the service is typically an aggregation of performance metric values that measure various aspects of the health of the service, such as a quality of service provided, a level of risk of the service in breaching an SLA or other requirement, and an availability of the service. When a particular service is selected from the listing of services, such as the CORE ROUTERS service 112, the details of the selected service are retrieved from the performance metric repository.

The details of the selected service, such as the details 120 of the CORE ROUTERS service 112, that are presented include an availability summary status 122 over a period, such as 24 hours. Each of various availability statuses may be displayed in a pie chart or other representation capable of conveying a summary of the availability data. Some embodiments include a control for a user to select a period over which the summary is to be provided, such as the last 24 hours, the previous week or month, or other period. Some embodiments may include another summary view 124 of the same data as the availability summary status 122, but in a different form, such as a timeline. However, differing summary data with regard to the selected service may alternatively be provided.

The user interface 100 provides an example view of performance metric data that may be utilized for several purposes. One such purpose is to identify a period of interest for when a pattern or anti-pattern may be present. In such instances, the administrator may trigger the start of a process to generate a pattern or anti-pattern by providing input through the user interface 100. In other embodiments, a potential pattern or anti-pattern may be identified automatically through execution of one or more the methods described herein.

Figure 2:
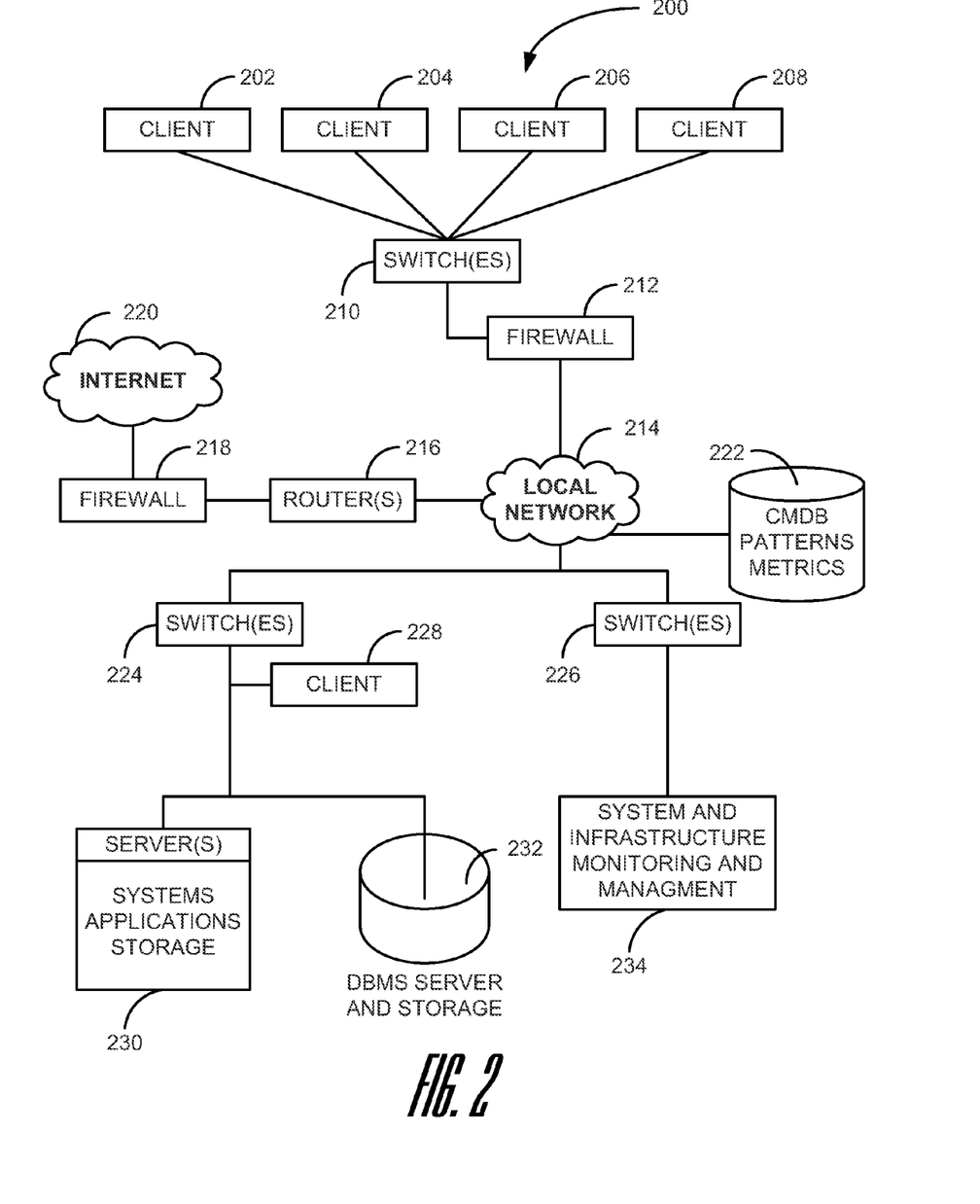
FIG. 2 is a schematic diagram of a system according to an example embodiment.

FIG. 2 is a schematic diagram of a system 200 according to an example embodiment. The system 200 is an example of a system within which patterns and anti-patterns maybe identified and implemented. The system 200 is provided merely as an example of a system in which some embodiments may be relevant. Although the system 200 is illustrated to include various IT resources, there is no requirement that all or any of these particular IT resources be present in any embodiment. Further, even if present in a particular embodiment, the CIs of these IT resources may not be relevant with regard to pattern detection, use, or sharing.

The system 200 is a networked computing environment. The network of the computing environment may include a connection to the Internet 220. In such embodiments, the remainder of the network environment is behind a firewall 218 to help shield the network environment from threats. In a typical configuration, one or more routers 216 then route traffic to a local network 214. A portion of the local network 214 may be shielded from access by some users or processes by another firewall 212. In this illustrated embodiment, the firewall 212 shields clients 202, 204, 206, 208 connected to the networked computing environment via one or more switches 210 from certain types of communications or data over the local network 214.

The local network 214 may also include connections to other IT resources, such as switches 224, 226 that provide additional connections to the local network 214. The additional connections may be utilized by additional clients 228, servers 230 such as one or more application servers hosting an enterprise application, database and storage servers 232, and a system and infrastructure monitoring and management server 234. The additional connections may also be utilized by a database 222 storing a configuration management database (CMDB), data representative of patterns and anti-patterns, performance metrics, historic performance metric data, and other IT resources.

In some embodiments, the hardware devices and processes within the computing environment, such as the firewalls 218, 212, routers 216, switches 210, 224, 226, servers 230, databases 222, 232, and other devices and processes, include an agent process that may be leveraged by the system and infrastructure monitoring and management server 234. The agent processes of the hardware devices and processes may be Simple Network Management Protocol (SNMP) agent processes through which performance may be measured and configurations may be modified. In other embodiments, the agent processes of the hardware devices and processes may be proprietary agent processes, modified SNMP agent processes, or agent processes according to a different network management protocol. Yet other embodiments include two or more of such agent processes.

In some embodiments, the system and infrastructure monitoring and management server 234 performs several tasks through various processes. Such tasks may include application of performance-monitoring metrics within the networked computing environment 200 and archiving of performance metric data, presenting analytic views of performance metric data such as through the user interface 100 of FIG. 1, and providing administrator tools to modify CI settings of the various IT resources of the networked computing environment 200. Such tasks also include archiving historic CI settings, pattern and anti-pattern identification through evaluation of archived performance metric data of service models and archived CI settings of respective service models, and pattern selection and implementation to resolve performance metric violations and anti-pattern presence.

In some embodiments, the system and infrastructure monitoring and management server 234 applies performance-monitoring metrics within the networked computing environment 200. Performance-monitoring metrics, or simply metrics, measure various aspects of performance of devices and processes within the networked computing environment 200. One or more metrics may be associated with a service model and an aggregation of metric result data of the one or more metrics associated with a particular service model provides a performance measurement of the particular service model. A performance metric may be defined by an administrator to measure response time of hardware networking devices, latency in process response, availability of a device or process, available storage capacity of a data storage device, and other performance characteristics of devices and processes. A service model may include one or more aggregations of metric data to provide an overall measurement of service model health, quality, risk, availability, or other indicator depending on the embodiment.

In operation, the system and infrastructure monitoring and management server 234 retrieves metrics for a service model from a database 222 or other data storage location. The infrastructure monitoring and management server 234 then applies the metrics to obtain metric data by sending messages, such as SNMP messages, to the various devices or processes that are the subject of the retrieved metrics. The metric data is then stored, such as in the database 222. The granularity at which metric data is stored may vary between embodiments. Some embodiments may store all metric measurements while other embodiments may store a calculated value or indicator of one or more of health, quality, risk, availability, or other calculated value or indicator for a service model. In any event, when the metric data is stored, a date identifying when the metric data was generated is also stored.

Administrator tools of the infrastructure monitoring and management server 234 in some embodiments may include tools to modify CI settings of the various IT resources of the networked computing environment 200. Such tools may include client-based or web-based user interfaces, and underlying computer code, providing a view of current CI settings and allowing the administrator to modify the CI settings. Such tools may also include client-based or web-based user interfaces, and underlying computer code, to present a view of patterns available for implementation with regard to a particular service model. Such user interfaces may also allow an administrator to select a pattern for implementation. When a selection of a pattern is received for implementation, the infrastructure monitoring and management server 234 may issue commands to the IT resources of CIs included in the pattern to modify CI configuration settings. In other embodiments, the infrastructure monitoring and management server 234 may issue one or more commands to a provisioning process that operates to implement changes in the networked computing environment 200. In these and other embodiments, one or more change requests may also, or alternatively, be generated and submitted to a change request system requesting that the pattern be implemented.

However, when the infrastructure monitoring and management server 234 makes changes to CI settings, previous values of the CI configuration settings are written to a log or archive of the configuration settings along with a date when the change was made. The archive of configuration settings and the stored metric data, both including dates, may then be used to correlate changes in performance of a service model's performance to changes in CI settings of the service model. For example, a process of the infrastructure monitoring and management server 234 may operate to identify performance improvements over various periods. For example, if a change in a health indicator of a service model in the stored metric data changes more than ten percent, assuming the indicator is measured by a percentage, over a 24-hour period, the configuration setting archive may then be evaluated to determine if a change was to the CI configuration settings.

In some embodiments, when a configuration change is identified, the current configuration of the service model is compared to the pervious configuration to identify the modified CI configuration settings. When the health indicator changes upward, indicating the service model is healthier, the identified CI configuration settings are stored as a candidate pattern. When the health indicator changes downward, indicating the service model is less healthy, the identified CI configuration settings are stored as a candidate anti-pattern. Candidate patterns and anti-patterns may then be presented in an interface to an administrator to receive confirmation that the identified CI configuration settings do form a pattern or anti-pattern. The administrator may also be presented with the option to add metadata to the pattern. The metadata may describe what is accomplished or resolved through implementation of the CI configuration settings of the pattern, an association to a particular hardware device type or model, an association to a software program and version, and other metadata, depending on the particular embodiment. In the instance of an anti-pattern, an administrator may add metadata associating the anti-pattern to a pattern which can be implemented to resolve the issues presented by the anti-pattern. The pattern or anti-pattern is then typically stored to the database 222 or other data storage location.

In some embodiments, when the infrastructure monitoring and management server 234 includes stored anti-patterns, a process may execute within the networked computing environment to identify service models having CI configuration settings matching anti-patterns. When an anti-pattern is identified within a current configuration of the networked computing environment 200, a notice may be provided to an administrator. In some embodiments, when an anti-pattern is identified and the identified anti-pattern includes a pattern associated in metadata, the CI configuration settings of the pattern may be automatically implemented, such as through a provisioning application or process.

In some embodiments, upon detection of a performance metric violation by a process of the infrastructure monitoring and management server 234, the process may search the stored patterns, such as in the database 222, to identify a pattern that may be implemented to resolve the performance metric violation. When a pattern is identified, the pattern may be automatically implemented, such as through a provisioning application or process. In other embodiments, a message may be sent to an administrator including an identification of the performance metric violation and data representative of the identified pattern.

As discussed above, patterns and anti-patterns are identified and utilized with regard to CIs of service models. The CIs of a service model may represent elements of IT infrastructure technology such as routers, switches, data storage devices, servers, client computers, logical server programs and processes, and applications and processes that execute on server or client computers. Service models may be associated with metrics. The metrics evaluate parameters of the service model to obtain indicators of quality, availability, risk, and heath levels of an underlying system and identify constituent CIs that are affecting the service model. These metrics and indicators can be defined with Service Level Agreements or Objectives (SLA or SLO) and their associated operational level agreements.

Figure 3:
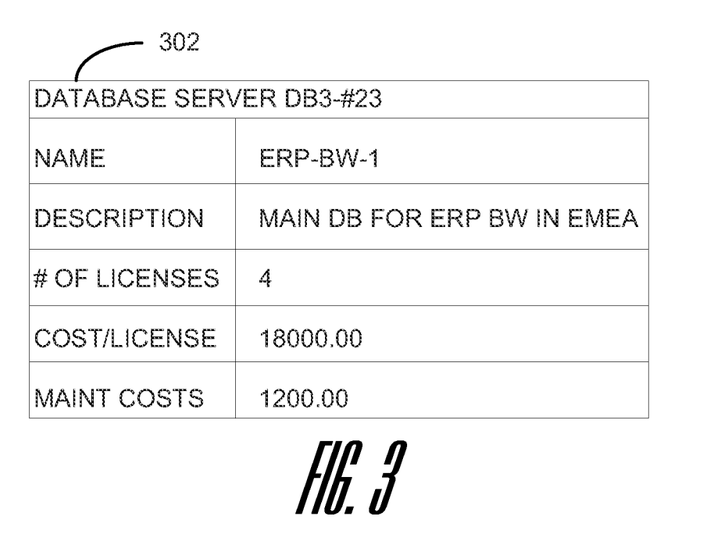
FIG. 3 illustrates a data structure according to an example embodiment.
Figure 4:
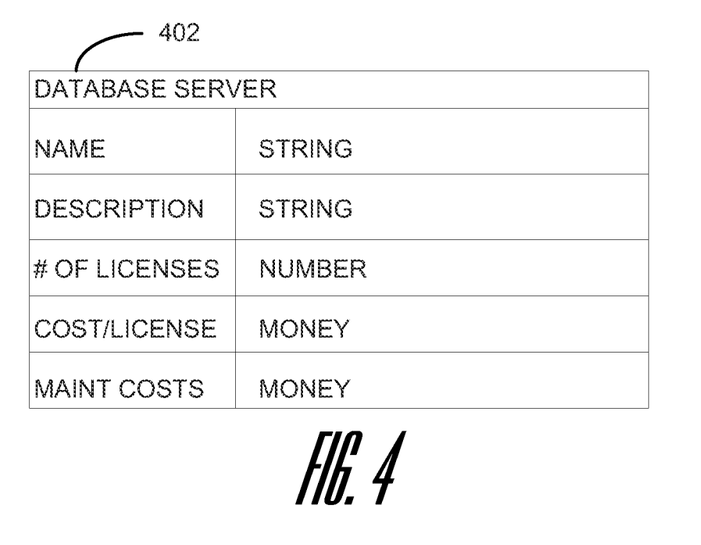
FIG. 4 illustrates a data structure according to an example embodiment.
Figure 5:
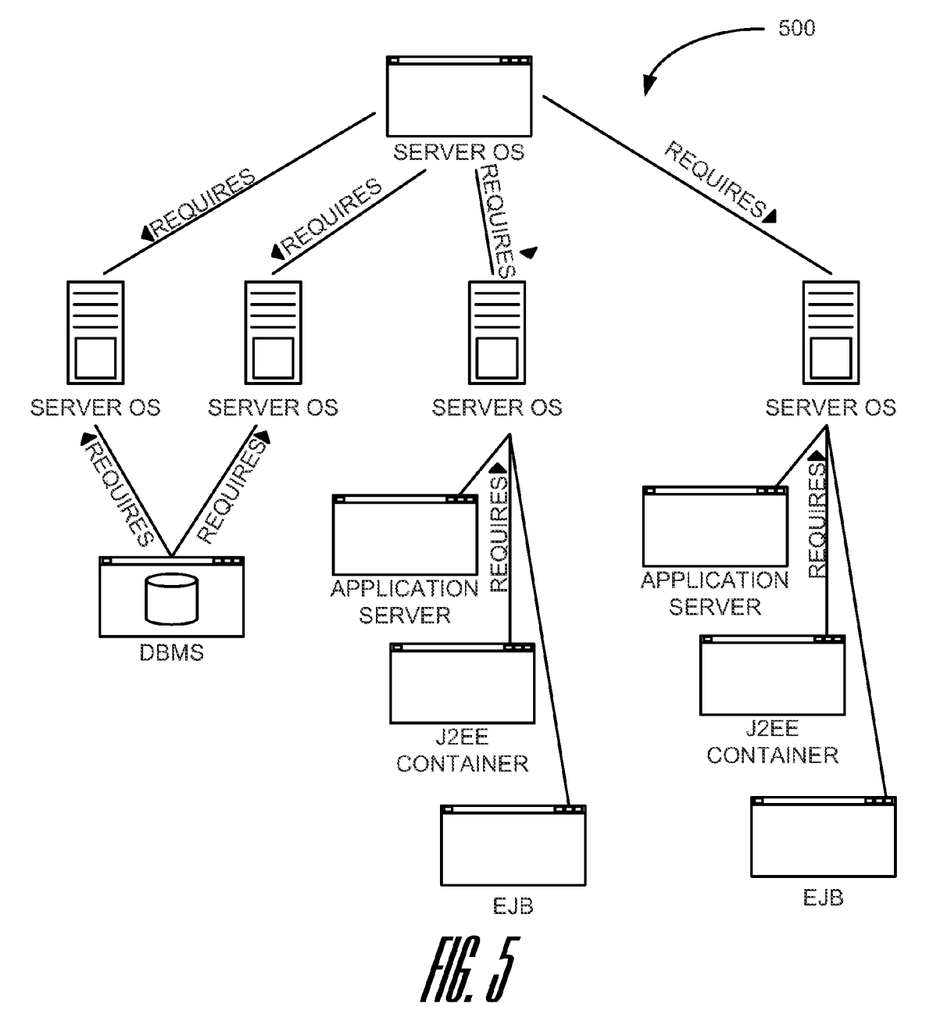
FIG. 5 illustrates a graphical representation of an abstracted service model according to an example embodiment.

A service model is an implementation of an abstract model, such as is illustrated in FIG. 5. The abstract model of FIG. 5 includes a graphical representation of abstracted CIs of the service model. FIG. 4 illustrates an abstraction of an example CI. FIG. 3 illustrates a CI from which the abstraction of FIG. 4 may be generated.

FIG. 3 illustrates a data structure 302 according to an example embodiment. The data structure 302 is an example of a CI. The data structure 302 includes an identifier (DATABASE SERVER DB3-#23), a name, a description, and other data. The other data includes "# of Licenses," a cost-per-license, and maintenance costs. The data of the CI data structure 302 may be modified as discussed above. Upon modification, a snapshot of the data is stored in a database along with a date when the data was changed. The snapshot may be used following the modification should a change in system performance be detected indicating a pattern or anti-pattern may be present in a system configuration. A snapshot of the data structure 302, along with other CIs of a service model, may also be taken upon detection that the CI of the data structure is associated with a service model that maintains or improves performance over time indicating a possible pattern or degrades performance of a service model over time indicating a possible anti-pattern.

When building a service model, to which performance metrics may be associated to measure performance of the service model, abstractions of service model CIs, such as the CI illustrated in FIG. 3, are made. FIG. 4 illustrated a data structure 402 according to an example embodiment. The data structure 402 is an example of an abstraction of the CI data structure 302 of FIG. 3. A service model is comprised of one or more abstracted configuration models and typically includes one or more associated performance metrics to measure and monitor performance thereof when implemented. A graphical representation of an example abstracted service model is illustrated in FIG. 5.

FIG. 5 illustrates a graphical representation of an abstracted service model 500 according to an example embodiment. The abstracted service model 500 includes a CI for each node of the service model and defines relationships there between. For example, a server operating system requires a server and database management systems, application servers, J2EE containers, and Enterprise Java Beans (EJBs) require a server having an operating system. Each node, such as the servers, server operating system, database management system (DBMS), and the like is an abstracted CI, such as is illustrated and described with regard to the CI data structure 402 of FIG. 4, although the configuration settings of each CI will vary between CI types. When implemented, each CI of the abstracted service model is associated with an IT resource of a computing environment, such as the networked computing environment 200 as illustrated and described with regard to FIG. 2. When a snapshot of the CIs is taken upon occurrence of a CI modification event, a detected improvement or degradation of performance with regard to the service model, or at another time, the CI configuration values of the relevant CIs are taken and stored in a database with a date of when the snapshot was taken. In some embodiments, a time of day when the snapshot was taken is also included with the date.

When a candidate or actual pattern is detected, the abstracted service model is a template for generating the pattern data structure. The CI configuration settings for the pattern are populated into the pattern data structure, which is an instance of the abstracted service model. The pattern may then be augmented with additional data, such as metadata. The additional data may include a pattern name and classification that is descriptive and unique among patterns that help in identifying and referring to the pattern. The additional data may also include data describing the goal behind the pattern and the reason for using it, alternative names for the pattern, motivations for using the pattern such as use case descriptions, and contextual information describing a context within which the pattern may be useful. In some embodiments, the additional data may also include a graphical representation of the pattern, such as is illustrated in FIG. 5, and a listing of CIs, processes, services, and devices utilized in the pattern and descriptions of their respective roles. Some patterns might also include a description of results, side effects, and tradeoffs caused by using the pattern, or a description of how to implement the pattern. The additional data in some of these embodiments may also include an instruction set for a provisioning application to automatically implement the pattern. Other additional data may be included in these and other embodiments.

Following instantiation of a pattern and population of the pattern with CI configuration settings and relevant additional data, the pattern is stored, such as in the database 222 of FIG. 2.

Pattern and Anti-Pattern Usage and Sharing

Stored pattern data structures representing patterns and anti-patterns are utilized for two distinct purposes. Patterns define known solutions that are likely to remediate successfully particular defined problems. Anti-patterns are defined problems that may exist in systems. Anti-patterns can therefore be used to evaluate a configuration of a system within which a service model of an anti-pattern is present. If the service model of an anti-pattern is present in a system, the anti-pattern is utilized to determine if there is a match, either exact or relative to some degree. If there is a match, a potential problem is identified. A problem may also be identified through application of performance metrics. In either case of problem identification, details of the identified problem may be used to automatically or manually query the stored patterns to identify potential solutions. The solutions may be identified through the additional data of the stored patterns as described above. An identified pattern may then be selected and implemented to resolve the identified problem. However, in some embodiments, metadata of an anti-pattern may include a reference to one or more patterns that will remediate the anti-pattern.

Figure 6:
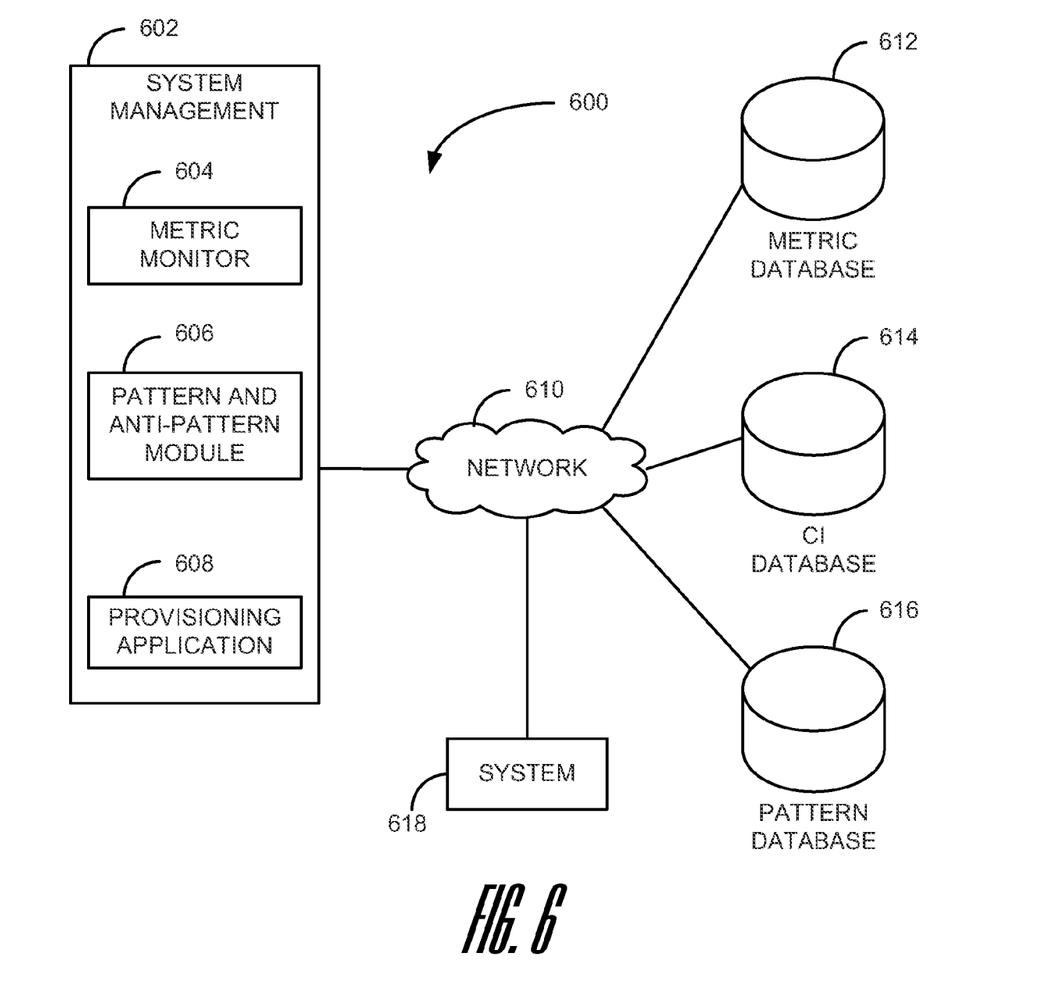
FIG. 6 is a logical block diagram of a system according to an example embodiment.

FIG. 6 is a logical block diagram of a system 600 according to an example embodiment. The system 600 is an example of a system within which pattern identification and usage is performed. The example system 600 includes a system under management 618, such as the networked computing environment 200 of FIG. 2 of a software system deployed therein.

The system 600 includes a system management application 602. The system management application 602 may include various modules to perform various tasks. For example, the system management application 602 may include a metric monitoring module 604, a pattern and anti-pattern module 606, and a provisioning application module 608. Although these modules 604, 606, 608 are illustrated and described with regard to a single system management application 602, the functionality of these modules 604, 606, 608 may be provided by individual applications, by more than one application, within the same module, or other arrangement.

The system management application 602 is connected to a network 610, such as one or more of a local area network, the Internet, or other network. Also connected to the network 610 are the system under management 618, a metric database 612, a configuration item (CI) database 614, and a pattern database 616. Although the system under management 618 is illustrated as a single box, the system under management may be the networked computing environment 200 of FIG. 2, an instance of the service model 500 illustrated in FIG. 5, an enterprise application, or other application, computing environment, or set of computing resources.

The metric monitoring module 604, upon identification of a trend of improving and decreasing performance or a performance metric violation, may also send a communication to the pattern and anti-pattern module 606 to evaluate the identified trend or performance metric violation to determine if a new pattern has been identified. In some embodiments, the current configuration of the CIs of the relevant service module may be evaluated in view of known patterns and anti-patterns stored in the pattern database 616. If a known pattern or anti-pattern is not identified, a process of the pattern and anti-pattern module 606 may evaluate metric values stored in the metric database 612 in view of CI configurations settings stored in the CI database 614 to define a potential pattern.

The metric monitoring module 604 may include a process that monitors metric results stored in the metric database 612 to identify trends of improving and decreasing performance. The metric monitoring module 604 also includes a process that identifies when performance metric violations, such as service level agreement violations, occur. Upon detection of decreasing performance or a metric violation, the process may query patterns stored in the pattern database 616 to identify patterns that may be relevant for resolving the metric violation or improving the decreasing performance of the system under management 618. Upon identification of a pattern to resolve the identified issue, the process of the metric monitoring module 604, in some embodiments, may submit a request to a service desk application requesting manual implementation of the identified pattern by an administrator. In other embodiments, upon identification of a pattern to resolve the identified issue, the process may submit a command to the provisioning application 608 requesting automated implementation of the identified pattern. The provisioning application 608 in such instances will then deploy the CI settings of the pattern to the system under management 618.

The metric monitor module 604, upon identification of a trend of improving and decreasing performance or a performance metric violation, may also send a communication to the pattern and anti-pattern module 606 to evaluate the identified trend or performance metric violation to determine if a new pattern has been identified. In some embodiments, the current configuration of the Cis of the relevant service module may be evaluated in view of known patterns and anti-patterns stored in the pattern database 616. If a known pattern or anti-pattern is not identified, a process of the pattern and anti-pattern module 606 may evaluate metric values stored in the metric database 612 in view of CI configurations settings store in the CI database 614 to define a potential pattern.

Upon detection and definition of a pattern or anti-pattern, the pattern and anti-pattern module 606 may send a copy of the pattern or anti-pattern over the network to a pattern sharing service (not illustrated). The pattern sharing service may be a service hosted by an industry consortium, a software development company, or other entity for sharing knowledge through identified patterns and anti-patterns. When a pattern or anti-pattern is sent to the pattern sharing service, a process may execute upon the received pattern to identify similarities with other patterns previously received by the service. Duplicate patterns are discarded. The pattern sharing service then makes the remaining patterns and anti-patterns available. In some instances, the patterns and anti-patterns may be pushed to or periodically downloaded to the pattern database 616 of constituents of the pattern sharing service.

Figure 7:
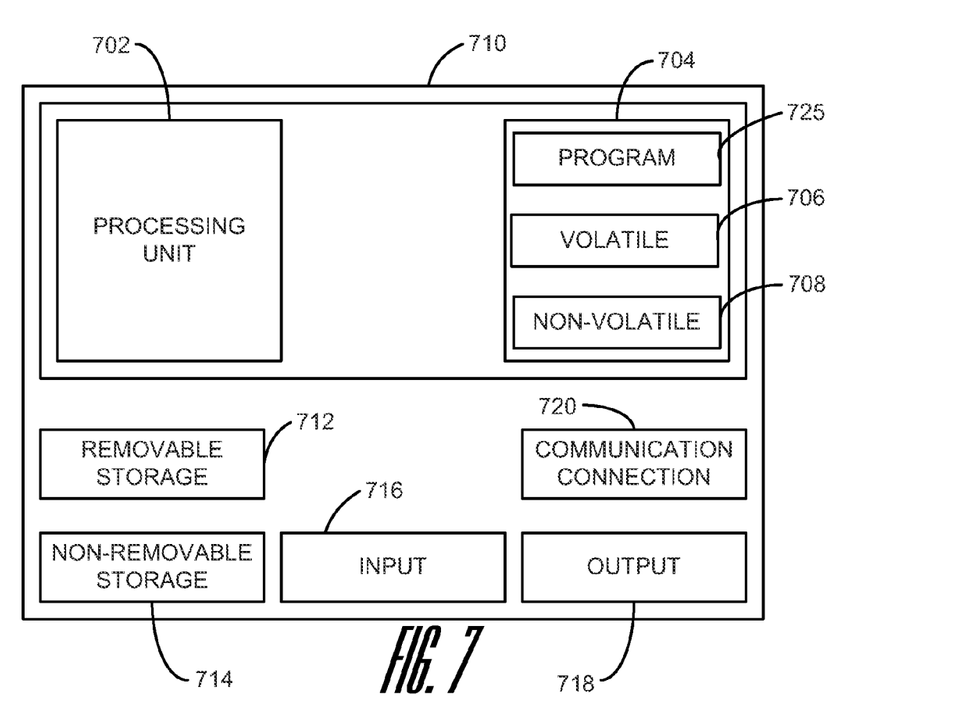
FIG. 7 is a block diagram of a computing device according to an example embodiment.

FIG. 7 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable storage medium are executable by the processing unit 702 of the computer 710. A hard drive, CD-ROM, and RAM are some examples of articles including a computer-readable storage medium. For example, a computer program 725 capable performing one or more of the method described herein. Further, the computer program 725 may be the system management application 602 program illustrated and described with regard to FIG. 6.

Method Embodiments

Figure 8:
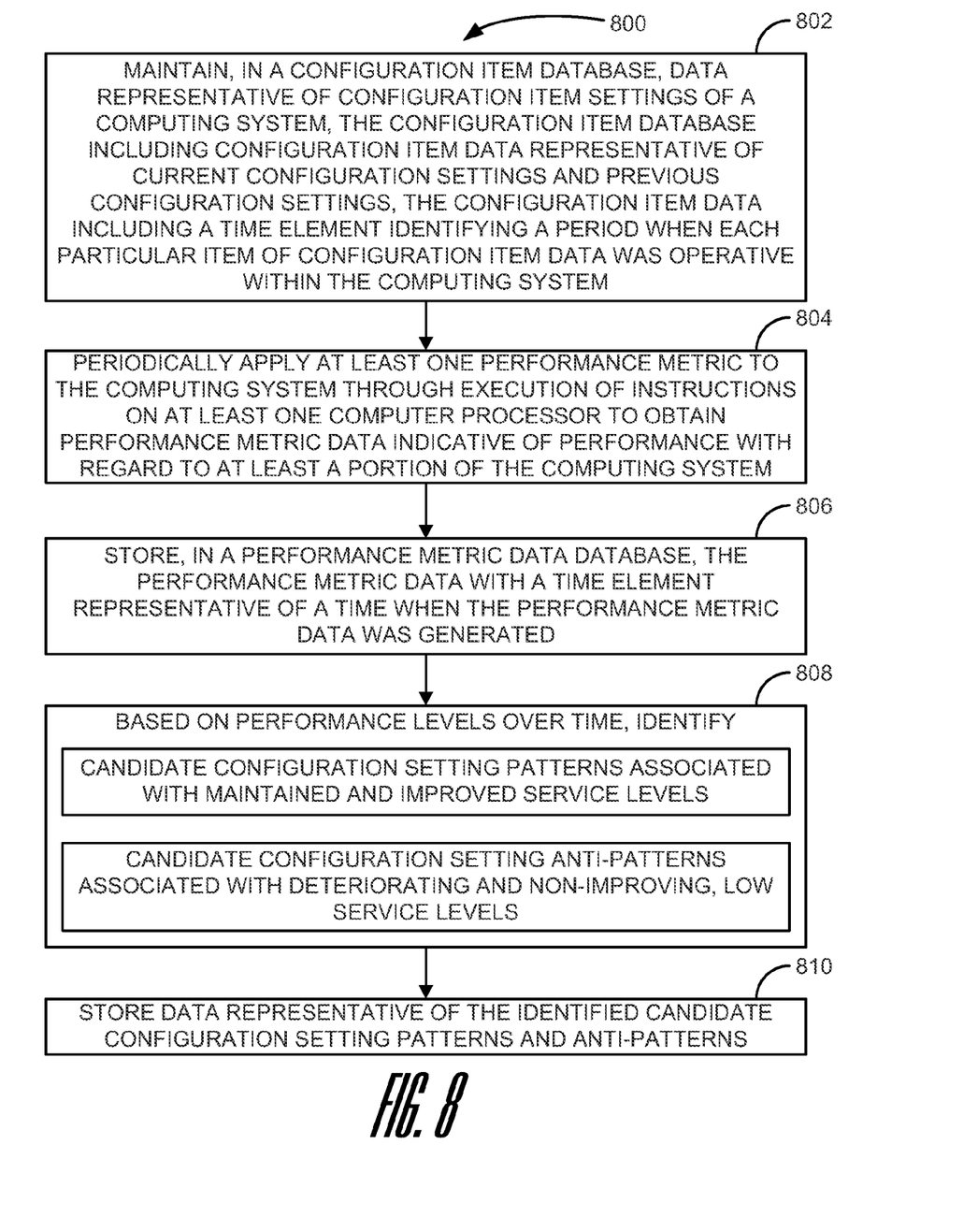
FIG. 8 is a flow diagram of a method according to an example embodiment.
Figure 9:
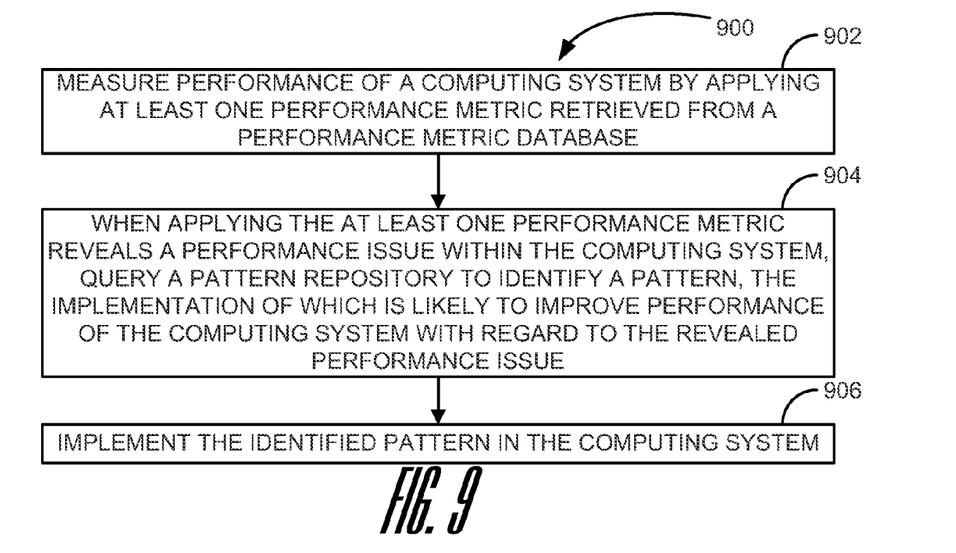
FIG. 9 is a flow diagram of a method according to an example embodiment.
Figure 10:
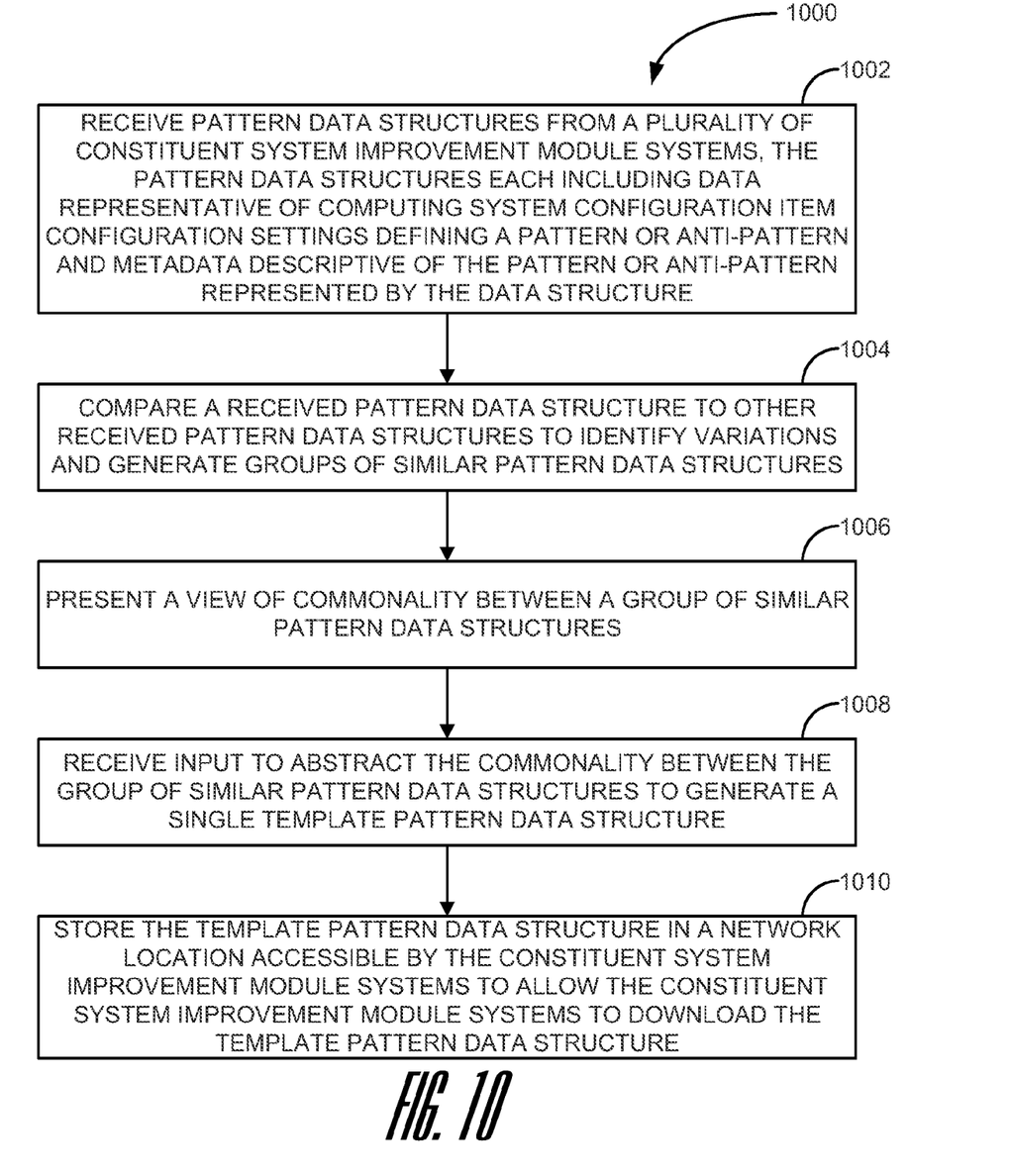
FIG. 10 is a flow diagram of a method according to an example embodiment.

FIG. 8, FIG. 9, and FIG. 10 provide examples of methods according to some example embodiments. FIG. 8 is an example of a method that may be performed to identify patterns and anti-patterns within a system. FIG. 9 is an example of a method that may be performed to utilize patterns to improve system performance. FIG. 10 is an example of a method that may be performed to share patterns and anti-patterns.

FIG. 8 is a flow diagram of a method 800 according to an example embodiment. As stated above, FIG. 8 is an example of a method that may be performed to identify patterns and anti-patterns within a system. The method 800 includes maintaining 802, in a configuration item database stored on a data storage device, data representative of configuration item settings of a computing system. The configuration item database may include configuration item data representative of current configuration settings and previous configuration settings. The configuration item data typically includes a time element identifying a period when each particular item of configuration item data was operative within the computing system.

The method 800 further includes periodically applying 804 at least one performance metric to the computing system through execution of instructions on at least one computer processor to obtain performance metric data indicative of performance with regard to at least a portion of the computing system. In various embodiments, the performance metrics may be retrieved from a database or other storage repository or the performance metrics may be hardcoded into a computer program performing the method 800. The periodic basis at which a particular performance metric is applied 804 may be set by a configuration setting. The periodic basis may be hourly, daily, weekly, monthly, or other period depending on the embodiment and the configuration.

Within the method 800, the performance metric data is also stored 806 in a performance metric data database. The performance metric data is typically stored with a time element representative of a time when the performance metric data was generated.

Additionally the method 800, based on performance levels over time, includes identifying 808 candidate configuration setting patterns associated with maintained and improved service levels. The identifying 808 of method 800 also includes identifying 808 candidate configuration setting anti-patterns associated with deteriorating and non-improving, low service levels. The method 800 may then store 810 data representative of the identified candidate configuration setting patterns and anti-patterns.

In some other embodiments, identifying 808 the candidate configuration setting patterns and anti-patterns includes identifying a performance level change over time by comparing performance metric data of a particular performance metric. Typically, the performance level change is identified between a current configuration and a previous configuration. The method 800 in such embodiments further includes comparing configuration item settings of the current configuration and the previous configuration to identify configuration item configuration setting differences. The identified configuration item setting differences, in such embodiments, may form at least a portion of a candidate configuration setting pattern or anti-pattern.

In some other embodiments, identifying 808 the candidate configuration setting patterns and anti-patterns includes identifying a performance level change over time by comparing performance metric data of a particular performance metric. Typically, the performance level change is identified between a current configuration and a previous configuration. The method 800 in such embodiments further includes comparing configuration item settings of the current configuration and the previous configuration to identify configuration item configuration setting differences. The identified configuration item setting differences, in such embodiments may form at least a portion of a candidate configuration setting pattern or anti-pattern.

Some such embodiments include presenting a view of an identified candidate pattern or anti-pattern to allow an administrator to review the candidate. The view may also allow the administrator to confirm or reject the candidate pattern or anti-pattern. Some embodiments may also allow the administrator to add metadata to the candidate as described above. Following receipt of confirmation from the administrator, such embodiments of the method 800 include generating a pattern data structure including the pattern or anti-pattern and storing the pattern data structure in a pattern repository on a data storage device.

FIG. 9 is a flow diagram of a method 900 according to an example embodiment. As stated above, FIG. 9 is an example of a method 900 that may be performed to utilize patterns to improve system performance. The method 900 includes measuring performance of a computing system by applying 902 at least one performance metric retrieved from a performance metric database. When applying 902 the at least one performance metric reveals a performance issue within the computing system, the method 900 includes querying 904 a pattern repository to identify a pattern. Implementation of the identified pattern is likely to improve performance of the computing system with regard to the revealed performance issue. Thus, the method 900 also includes implementing 906 the identified pattern in the computing system.

The performance metric database, in some embodiments, stores performance metrics that are executable to measure performance of the computing system. The metrics operate based on performance related data obtained from processes of the computing system and devices upon which the computing system operates, such as through SNMP messaging. In some embodiments, the method 900 further includes measuring performance of the computing system subsequent to implementing 906 the identified pattern to confirm the implemented pattern resolved the intended performance issue and did not create new one. The performance measurement may be performed according to a metric identified in the data of the implemented 906 pattern, metrics relevant to a modified service model, or other metrics.

FIG. 10 is a flow diagram of a method 1000 according to an example embodiment. As stated above, FIG. 10 is an example of a method 1000 that may be performed to share patterns and anti-patterns. The method 1000 is typically performed at least in part on a server that operates on a network, such as the Internet, to receive patterns from constituent systems and organization and make the patterns available to other constituents.

The method 1000 includes receiving 1002 pattern data structures from a plurality of constituent system improvement module systems. The system improvement modules may include a module such as the pattern and anti-pattern module 606 illustrated and described with regard to FIG. 6. The pattern data structures of the method 1000 may each include data representative of computing system configuration item configuration settings defining a pattern or anti-pattern and metadata descriptive of the pattern or anti-pattern represented by the data structure.

The method 1000 also includes comparing 1004 a received pattern data structure to other received pattern data structures to identify variations and generate groups of similar pattern data structures. The method 1000 may then present 1006 a view, to a user, of commonality between a group of similar pattern data structures and receive 1008 input, from the user, to abstract the commonality between the group of similar pattern data structures to generate a single template pattern data structure. The method 1000 may then store 1010 the template pattern data structure in a network location accessible by the constituent system improvement module systems to allow the constituent system improvement module systems to download the template pattern data structure.

In some embodiments, presenting 1006 the view of the commonality includes presenting, in a user interface, a representation of configuration item configuration settings that are identical within the group of similar pattern data structures and configuration item configuration settings that appear in less than the entire group of similar pattern data structures. The user interface in such embodiments is capable of receiving selection input of configuration item configuration settings that appear in less than all of the group of similar pattern data structures to include in the single template data structure. The user interface is also capable of receiving input to initiate a process to generate the single template data structure.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   at least one processor;
   at least one memory device;
   at least one data storage device;
   a pattern repository including data stored on the at least one data storage device, the pattern repository holding pattern data structures each including data representative of computing system configuration item configuration settings defining a pattern or anti-pattern, the data representative of a pattern defining a known solution to a defined problem and the data representative of an anti-pattern defining a bad solution to a defined problem;
   a performance metric database storing:
      performance metrics executable by the at least one processor to measure performance of a computing system based on performance related data obtained from processes of the computing system and devices upon which the computing system operates; and
      performance metric data provided as a result of applying performance metrics, each performance metric data item including a time data element identifying when the performance metric data was generated; and
   a system improvement module having instructions stored and retrievable from the at least one data storage device into the at least one memory device, the instructions executable by the at least one processor to:
      measure performance of the computing system by applying at least one performance metric retrieved from the performance metric database;
      when applying the at least one performance metric reveals a performance issue within the computing system, automatically query the pattern repository to identify a pattern, the implementation of which is likely to improve performance of the computing system with regard to the revealed performance issue, the performance issue revealed by matching at least a portion of the at least one performance metric with an anti-pattern, the automatic query performed based at least in part on the matched anti-pattern to identify a pattern that defines a solution to a defined problem associated with the matched anti-pattern; and
      when the automatic query identifies a pattern, automatically implement the identified pattern in the computing system.

2. The system of claim 1, wherein the system improvement module includes further instructions executable by the at least one processor to:
   measure performance of the computing system, subsequent to implementing the identified pattern, based on the at least one performance metric and other performance metrics to confirm the identified pattern, when implemented, resolved the previously revealed performance issue and to identify other performance issues that may arise due to the implementation of the identified pattern.

3. The system of claim 1, wherein implementing the identified pattern in the computing system includes:
   sending a command to a provisioning computer application to implement the configuration item configuration settings of the identified pattern or anti-pattern within the computing system.

4. The system of claim 1, wherein the system improvement module includes further instructions executable by the at least one processor to:
   when the querying of the pattern repository to identify a pattern, the implementation of which is likely to improve performance of the system, fails to identify a pattern, compare configuration item settings of a current configuration of the computing system and a previous configuration of the computing system to identify configuration item configuration setting differences, the identified configuration item setting differences being a candidate configuration setting anti-pattern.

5. The system of claim 4, wherein the system improvement module includes further instructions executable by the at least one processor to:
   receive input confirming the candidate configuration setting anti-pattern as an anti-pattern;
   generate a pattern data structure including the anti-pattern and storing the pattern data structure in the pattern repository; and
   wherein the configuration item configuration settings of the anti-pattern represented by the data structure can be copied from the data structure and implemented in another computing system.

6. The system of claim 1, wherein the system improvement module includes further instructions executable by the at least one processor to:
   evaluate a configuration of the computing system based on anti-patterns retrieved from the pattern repository to identify potential or actual configuration issues.

7. The system of claim 6, wherein the system improvement module includes further instructions executable by the at least one processor to:
   when the evaluation of the configuration of the computing system reveals a potential or actual configuration issue within the computing system, query the pattern repository to identify a pattern, the implementation of which is likely to resolve the revealed potential or actual configuration issue; and
   implement the identified pattern in the computing system.

8. A non-transitory computer-readable storage device, with instructions stored thereon, which when executed by at least one processor of a computer, cause the computer to:

receive pattern data structures from a plurality of constituent system improvement module systems, the pattern data structures each including data representative of computing system configuration item configuration settings defining a pattern or anti-pattern, the data representative of a pattern defining a known solution to a defined problem and the data representative of an anti-pattern defining a bad solution to a defined problem, and metadata descriptive of the pattern or anti-pattern represented by the data structure;

compare a received pattern data structure to other received pattern data structures to identify variations and generate groups of similar pattern data structures;

present a view of commonality between a group of similar pattern data structures;

receive input to abstract the commonality between the group of similar pattern data structures to generate a single template pattern data structure;

receive input adding metadata associating the single template pattern data structure to another single template pattern data structure, when the single template pattern data structure defines an anti-pattern, the added metadata associating the single template pattern data structure to another single template pattern data structure defining a pattern providing a solution to the defined problem of the anti-pattern; and when the single template pattern data structure defines a pattern, the added metadata associating the single template pattern data structure to another single template pattern data structure defining an anti-pattern, the defined problem for which the pattern defined in the single template pattern data structure provides a solution; and store the single template pattern data structure in a network location accessible by the constituent system improvement module systems to allow the constituent system improvement module systems to download the single template pattern data structure.

9. The non-transitory computer-readable storage device of claim 8, wherein the data representative of the configuration item configuration settings of the pattern or anti-pattern represented within the data structures can be copied from a downloaded data structure and implemented by a constituent system improvement module in a computing system of the constituent system improvement module.

10. The non-transitory computer-readable storage device of claim 8, wherein each pattern data structure includes data from which a graphical representation of the configuration setting pattern or anti-pattern can be generated and data identifying configuration items, processes, and services related to the pattern or anti-pattern.

11. The non-transitory computer-readable storage device of claim 8, wherein:
a pattern data structure including configuration item configuration settings defining a pattern includes configuration item configuration settings associated with maintained and improved service levels; and
a pattern data structure including configuration item configuration settings defining an anti-pattern includes configuration item configuration settings associated with deteriorating and non-improving, low service levels.

12. The non-transitory computer-readable storage device of claim 8, wherein the data representative of computing system configuration item configuration settings defining a pattern or anti-pattern include configuration item configuration settings of at least one logical process and at least one physical device.

13. The non-transitory computer-readable storage device of claim 8, wherein the instructions executable by the processor cause the computer to receive input to abstract the commonality between the group of similar pattern data structures to generate a single template pattern data structure includes instructions executable by the at least one processor to cause the computer to:
present, in a user interface on a display device of the computer, a representation of:
configuration item configuration settings that are identical within the group of similar pattern data structures; and
configuration item configuration settings that appear in less than the entire group of similar pattern data structures;
receive selection input via the user interface of configuration item configuration settings that appear in less than all of the group of similar pattern data structures to include in the single template data structure; and
generate the single template data structure.

14. A method comprising:
receiving pattern data structures from a plurality of constituent system improvement module systems, the pattern data structures each including data representative of computing system configuration item configuration settings defining a pattern or anti-pattern, the data representative of a pattern defining a known solution to a defined problem and the data representative of an anti-pattern defining a bad solution to a defined problem, and metadata descriptive of the pattern or anti-pattern represented by the data structure;
comparing a received pattern data structure to other received pattern data structures to identify variations and generate groups of similar pattern data structures;
presenting a view of commonality between a group of similar pattern data structures;
receiving input to abstract the commonality between the group of similar pattern data structures to generate a single template pattern data structure;
receiving input adding metadata associating the single template pattern data structure to another single template pattern data structure,
when the single template pattern data structure defines an anti-pattern, the added metadata associating the single template pattern data structure to another single template pattern data structure defining a pattern providing a solution to the defined problem of the anti-pattern; and
when the single template pattern data structure defines a pattern, the added metadata associating the single template pattern data structure to another single template pattern data structure defining an anti-pattern, the defined problem for which the pattern defined in the single template pattern data structure provides a solution; and
storing the single template pattern data structure in a network location accessible by the constituent system improvement module systems to allow the constituent system improvement module systems to download the single template pattern data structure.

15. The method of claim 14, wherein the data representative of the configuration item configuration settings of the pattern or anti-pattern represented within the data structures can be copied from a downloaded data structure and implemented by a constituent system improvement module in a computing system of the constituent system improvement module.

16. The method of claim 14, wherein each pattern data structure includes data from which a graphical representation of the configuration setting pattern or anti-pattern can be generated and data identifying configuration items, processes, and services related to the pattern or anti-pattern.

17. The method of claim 14, wherein:
- a pattern data structure including configuration item configuration settings defining a pattern includes configuration item configuration settings associated with maintained and improved service levels; and
- a pattern data structure including configuration item configuration settings defining an anti-pattern includes configuration item configuration settings associated with deteriorating and non-improving, low service levels.

18. The method of claim 14, wherein the data representative of computing system configuration item configuration settings defining a pattern or anti-pattern include configuration item configuration settings of at least one logical process and at least one physical device.

19. The method of claim 14, wherein the instructions executable by the processor cause the computer to receive input to abstract the commonality between the group of similar pattern data structures to generate a single template pattern data structure includes instructions executable by the at least one processor to cause the computer to:

present, in a user interface on a display device of the computer, a representation of:
- configuration item configuration settings that are identical within the group of similar pattern data structures; and
- configuration item configuration settings that appear in less than the entire group of similar pattern data structures;

receive selection input via the user interface of configuration item configuration settings that appear in less than all of the group of similar pattern data structures to include in the single template data structure; and generate the single template data structure.

* * * * *